Figure 1:
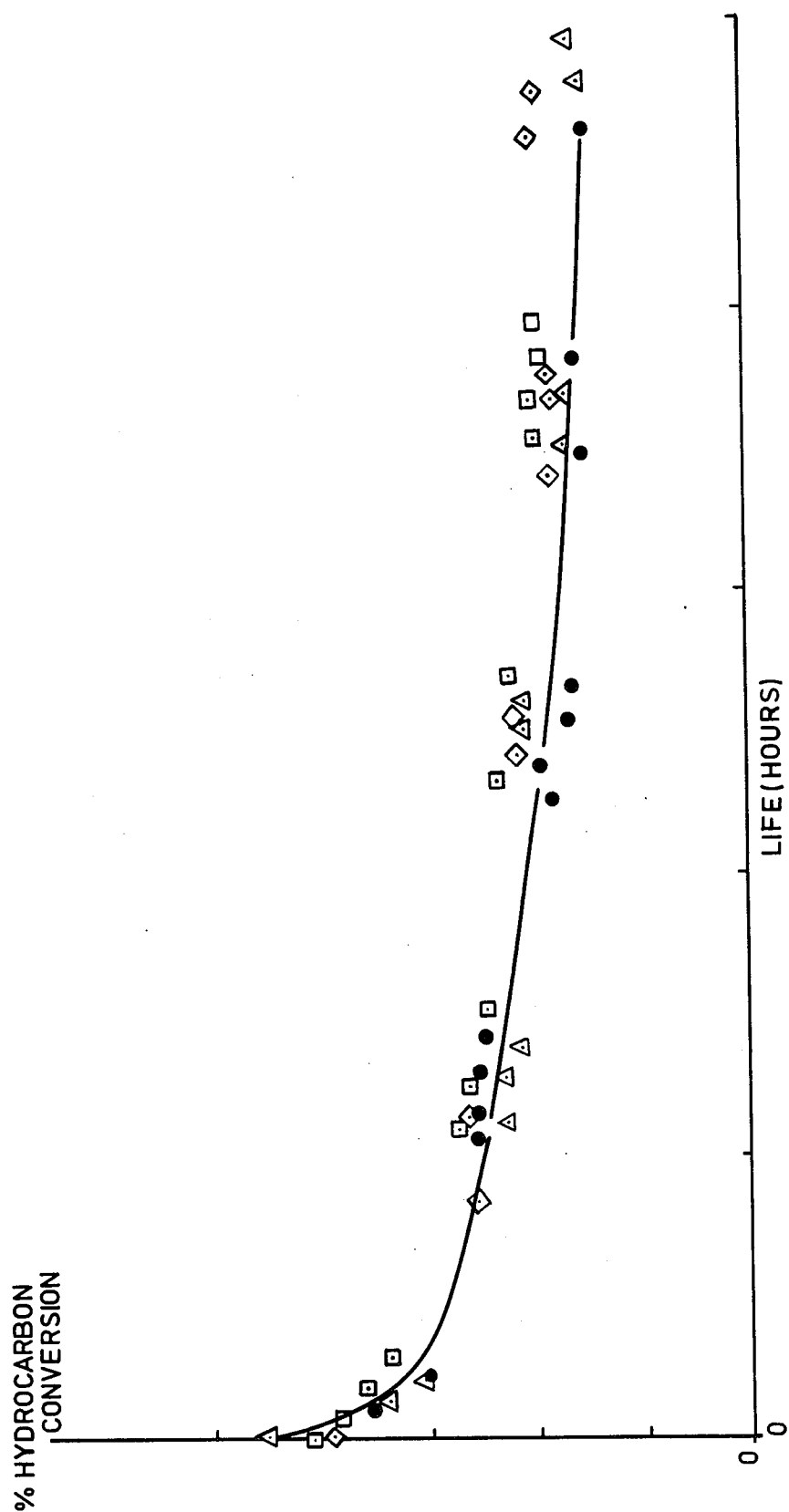

United States Patent [19]

Acres

[11] 4,053,556

[45] Oct. 11, 1977

[54] CATALYSIS

[75] Inventor: Gary James Keith Acres, London, England

[73] Assignee: Johnson, Matthey & Co., Limited, London, England

[21] Appl. No.: 668,035

[22] Filed: Mar. 18, 1976

Related U.S. Application Data

[60] Continuation-in-part of Ser. No. 617,161, Sept. 26, 1975, abandoned, which is a division of Ser. No. 262,363, June 13, 1972, Pat. No. 3,909,452.

[30] Foreign Application Priority Data

June 16, 1971 United Kingdom ............... 28283/71
June 16, 1971 United Kingdom ............... 28314/71

[51] Int. Cl.² ............................................. B01D 53/34
[52] U.S. Cl. .................................... 423/239; 423/245; 423/247
[58] Field of Search ................... 423/213.5, 213.7, 239, 423/245, 247

[56] References Cited

U.S. PATENT DOCUMENTS

| | | | |
|---|---|---|---|
| 3,257,163 | 6/1966 | Stiles | 423/213.5 |
| 3,615,166 | 10/1971 | Hindin | 423/239 |
| 3,637,344 | 1/1972 | Thompson | 423/213.5 |
| 3,806,582 | 4/1974 | Acres et al. | 423/239 |

FOREIGN PATENT DOCUMENTS

| | | |
|---|---|---|
| 662,460 | 12/1951 | United Kingdom |
| 972,683 | 10/1964 | United Kingdom |
| 1,134,111 | 11/1968 | United Kingdom |

*Primary Examiner*—G. O. Peters
*Attorney, Agent, or Firm*—Cushman, Darby & Cushman

[57] ABSTRACT

This invention relates to processes for catalytically oxidizing organic compounds (for example, methane, ethane, propylene and carbon monoxide), catalytically reducing oxides of nitrogen with a reducing fuel as well as for the production of methane by the steam reforming of naphtha and naphtha distillates. The catalyst used in such processes consists essentially of an inert, rigid, porous refractory honeycomb structure coated with a mixture or alloy of platinum, rhodium and a base metal in which rhodium constitutes from 1 – 50 weight % and the base metal constitutes from 0.01 to 25 weight % of the total metal content.

13 Claims, 3 Drawing Figures

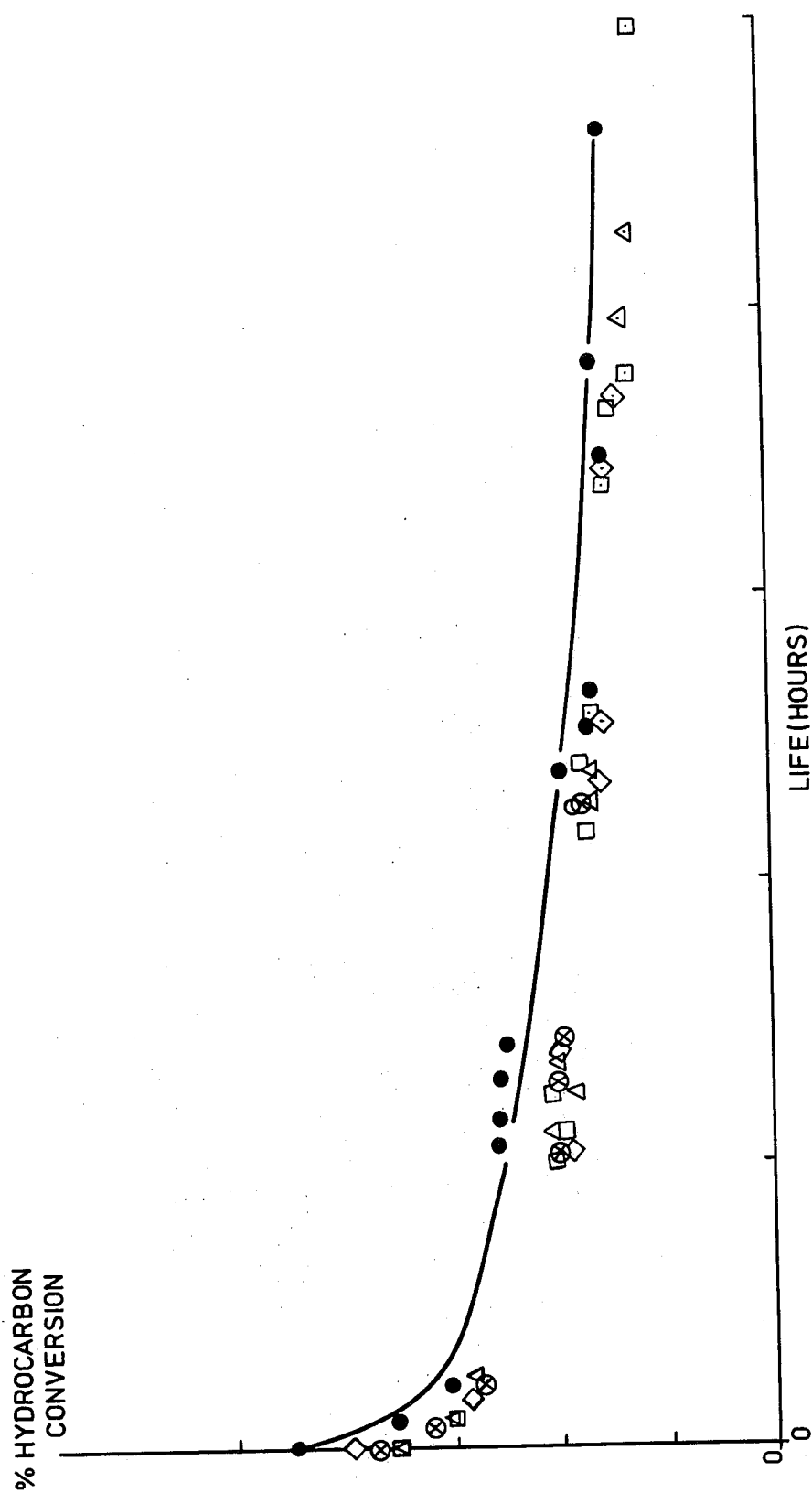

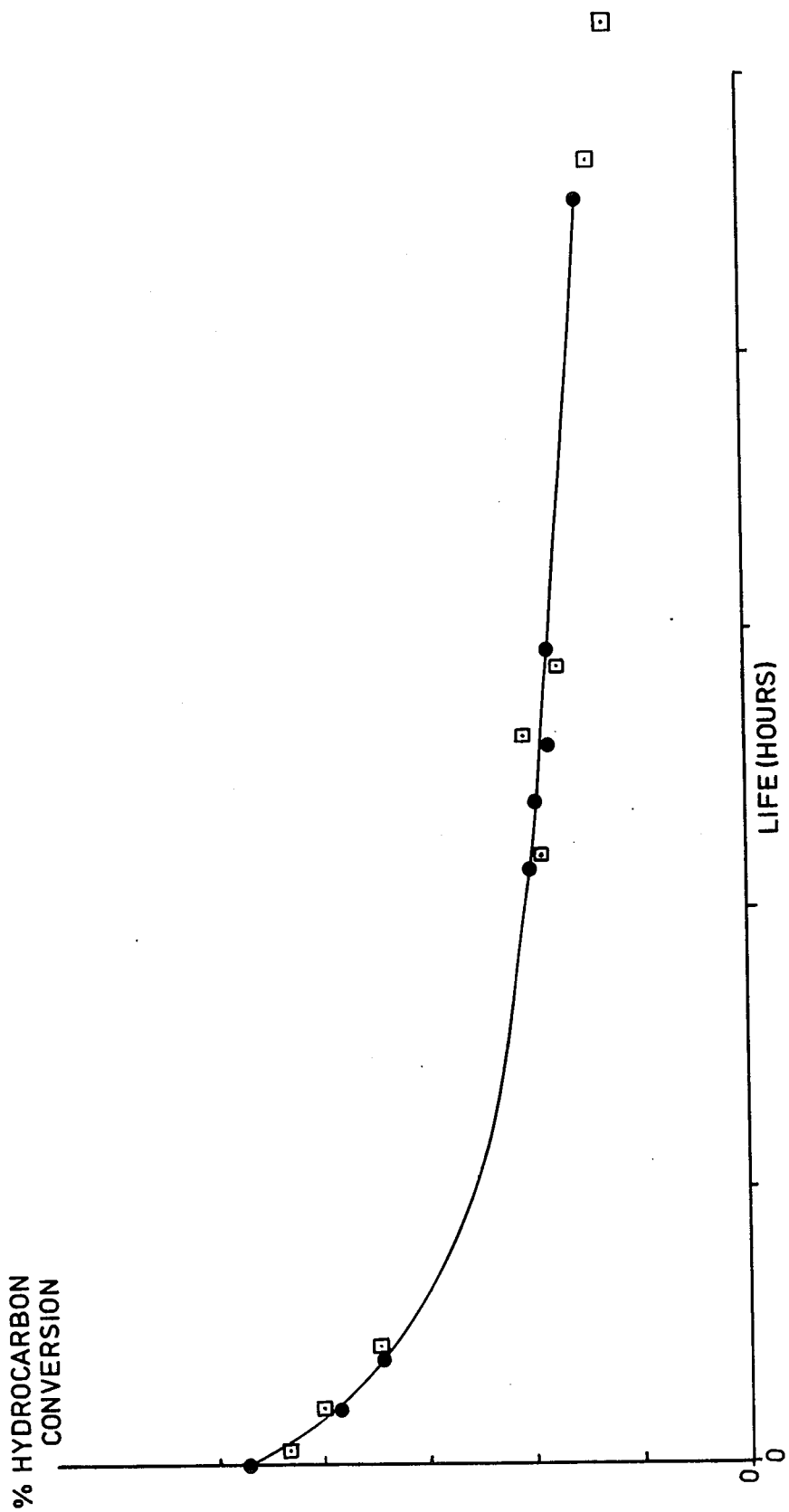

CATALYSIS

This application is a continuation-in-part of Ser. No. 617,161, filed Sept. 26, 1975, now abandoned, which in turn is a divisional of Ser. No. 262,363, filed June 13, 1972, now U.S. Pat. No. 3,909,452.

This invention relates to processes for catalytically oxidising organic compounds (for example methane, ethane, propylene and carbon monoxide), catalytically reducing oxides of nitrogen with a reducing fuel and oxidising an organic compound in a gas containing oxygen.

Methane, primarily as a result of its relative cheapness and its presence in natural gas is being used increasingly as a reducing fuel and may be oxidised in a number of industrially important processes.

Unburnt hydrocarbons, partially oxidised hydrocarbons, oxides or nitrogen and carbon monoxide contained in the exhaust gases from internal combustion engines in addition to a wide variety of other organic compounds produced by well established processes in the chemical industry, present serious problems of atmospheric contamination. For example, the oxide of nitrogen which is present in diesel exhaust gases is mainly nitric oxide. This is produced during the combustion of diesel fuel by the combination of nitrogen and oxygen at the high temperatures and pressures present in a combustion chamber. The presence of nitric oxide in the exhaust gases is particularly hazardous when the engine is used in a confined space.

Any engine operating parameter that reduces the combustion temperature will reduce the nitric oxide concentration. For example, retarding the engine, increasing the fuel concentration, reducing the compression ratio, reducing the maximum power output of the engine, and recycling the exhaust gases all lead to a reduction in nitric oxide levels.

Unfortunately, a number of these modifications which reduce nitric oxide levels also increase the CO and hydro-carbon content of the exhaust gases and therefore cannot be used without an exhaust gas purification unit.

Catalytic combustion is a well established procedure for the elimination of many of the components present in the exhaust from a diesel engine. The catalytic system works by promoting the combustion of the carbon monoxide, hydro-carbons, aldehydes, etc., that are present in the exhaust gases with oxygen. The products of this reaction are carbon dioxide and water, which of course, are odourless and non-toxic. Unlike the petrol engine, there may be up to 20% excess air in the exhaust gases of diesel engines, which affords adequate oxygen for combustion.

As the catalytic combustion reactions are more effective the higher the exhaust temperatures, it is preferable for the catalytic unit to be installed as close to the exhaust manifold as is practical.

Generally, catalytic oxidation takes place at a much lower temperature than that required by direct combustion and, because it is a surface reaction, is less influenced by the concentration of the reactants.

For safety reasons the concentration of combustible fume in plant air streams does not exceed 25% of the lower explosion limit and cannot therefore be ignited. The fume concentrations encountered in air pollution problems may range from 1 to 1000 ppm and for combustion to take place, the fume laden air must be raised to the autogenous ignition temperature which depends upon the chemical composition of the fume. It is rarely below 500° C and may be as high as 1000° C for complete combustion.

The cost of the fuel required to achieve these temperatures is frequently prohibitive and, in some cases, higher than the operating cost of the process generating the fume. Therefore, although combustion is an attractive method of destroying organic pollutants because it is continuous and produces no effluent, a means of reducing the reaction temperature is required to make the process more economic.

Hydro-carbons such as methane and ethane and other organic components emitted in the exhausts of diesel engines under medium or high load conditions require relatively high catalyst temperatures before reaction occurs. Thus, if a catalyst could be made which was active for methane and the lower hydro-carbons at substantially lower reaction temperatures it would constitute a substantial advance over the existing processes. Similarly, the use of a supported catalytic metal for air pollution abatement (frequently known as NOX abatement) the most difficult fuel to use is methane as it requires high catalyst temperatures befoe the reaction occurs. Methane is, however, one of the cheapest fuels available and if a catalyst could be made which was active for methane at substantially lower reaction temperatures, it would also constitute a substantial advance over the existing processes.

Production of nitric acid by the oxidation of ammonia normally results in a tail or waste gas containing noxious NO and $NO_2$. The presence of oxides in nitrogen in the tail gases results from the incomplete conversion of the nitrogen oxides to nitric acid, and the noxious oxides of nitrogen are usually discharged into the atmosphere. The discharge of these oxides of nitrogen into the atmosphere is undesirable since they are corrosive and present risk of injury to both vegetable and animal life.

The tail gas from nitric acid plants wherein ammonia is oxidised typically contains, by volume, from 0.1 to 0.5 percent of NO, trace to 0.3 percent of $NO_2$, from 2 to 5 percent of $O_2$ and the balance inert constituents, for example, nitrogen and argon. Additionally $N_2O$ may also be present in amount of from a trace to 1 percent by volume and also water vapour in amount up to 5 percent by volume.

For "NOX" abatement, it is desirable to remove all or substantially all of the nitrogen oxides before venting the tail gas to the atmosphere. However, both incomplete and complete removal of the nitrogen oxides are of commercial interest. It is an object of the present invention to enable more efficient purification of tail gases than hitherto has been possible by known processes. In a purification process involving the catalytic reduction of oxides of nitrogen, a reducing fuel (e.g. $H_2$, CO), a normally gaseous hydro-carbon, (namely methane or natural gas, or other hydro-carbon gases or liquids) are injected into the stream of tail gas and reacted with the nitrogn oxides in the stream. When the fuel stoichiometrically exceeds the nitrogen oxides and oxygen, the nitrogen oxides are reduced to exceedingly low concentraions. Because of the large gas flow involved in the manufacture of nitric acid (typically about 1 million standard cubic feet of gas per hour in a plant having a nitric acid production of 240 tons per day) the catalysts are required to have a high level of activity and the reactors are required to be capable of handling large gas flows.

Many nitric acid plants use high pressure processes in the ammonia oxidation step, and it is highly advantageous to recover from the plant tail gas, energy which can be utilised to supply power to the system. In some systems sufficient energy can be recovered for the process to be self-sustaining and even to provide additional power. In such systems it is important the catalyst be highly active, exhibit a minimum resistance to gas flow and catalyse the reaction at low initial reaction or ignition temperatures.

The catalyst itself should, however, still have reasonably high (750° – 800° C) temperature stability. Equivalent problems are associated with the use of natural gas (which is mostly methane but includes a certain amount of $H_2$).

Important advantages of low ignition temperature are:

a. better fuel conversion efficiency and lower running costs (that is, in those cases where the organic effluent is being used as a fuel);
b. a higher percentage removal of noxious gases escaping into the atmosphere;
c. smaller heat exchangers and a cheaper reactor system may be used, and
d. it makes possible the use of a single catalyst bed instead of a dual or other more complicated system.

It is another object of this invention to provide a process whereby ignition of organic contaminants may take place at a relatively low temperature, thus enabling them to be more completely removed from an effluent gas escaping into the atmosphere.

Air pollution control by catalytic combustion imposes a number of restrictions on the type of catalyst which may be used. In addition to a requirement that the catalyst should be active at low temperatures, it should be stable under both oxidising and reducing conditions. The catalyst when packed into a reaction should have a very low pressure drop across the bed and it should be resistant to attrition, thermal shock and clogging by dust particles.

Hitherto platinum has been the preferred catalyst for air pollution control. In the conventionally supported form, platinum is more active than base metal catalysts, it is stable up to at least 750° C and is resistant to poisoning by most elements except lead and phosphorus.

Supported platinum has been used in pelleted form but pressure drop problems through the catalyst bed and attrition between the individual catalyst pellets (which causes dusting and loss of precious metal) impose severe limitations on the design of the catalyst reactor.

The concentration of organic compounds in the fume is also important. In most cases, the concentration does not significantly affect the ignition temperature. A notable exception, however, is methane. The concentration of the fume and its composition does, however, determine the amount of oxygen that will be consumed and the temperature rise that will occur on the catalyst. This may be calculated and used in the design of the abatement plant. Where it is significant, the heat generated may sustain the oxidation or be recycled to maintain the temperature of the process gas.

The temperature of the gas stream containing the fume to a large extent determines the design of the plant required for pollution control. When the temperature is above that required for ignition, the catalyst may be placed directly in the gas stream. Examples of this use are wire-enamelling ovens, some paint-drying ovens, self-cleaning cookers and diesel or internal combustion engine exhaust systems.

In the purification processes, the catalysts are often subjected to temperatures of well over 500° C for considerable lengths of time and a major factor producing deactivation of the catalyst is the inability of the catalytically active refractory oxide support to withstand the corrosive conditions and temperatures obtaining for long periods of time. This is certainly true of the most popular support in use, catalytically active or gamma alumina. Alumina in this form is normally present as a coating on the support, e.g. some kind of refractory ceramic, possibly in honeycomb form. A catalytically active metal is normally deposited on the alumina.

Various mixtures and combinations of intermediate refractory metal oxide coatings and superficial catalytically active metals have been tried, all with varying degrees of success.

According to one aspect of the present invention, there is provided a process for the reduction with a reducing fuel of an oxide of nitrogen or the oxidation of an organic compound from a gas also containing oxygen comprising passing the gas mixture at an elevated temperature through a supported catalyst consisting essentially of an inert rigid porous refractory honeycomb structure coated with a mixture or alloy of platinum, rhodium and base metal in which the rhodium constitutes from 1 to 50 weight % and the base metal constitutes from 0.01 to 25 weight % of the total metal content.

According to a second aspect of the present invention, there is provided a process of catalytically reducing an oxide of nitrogen in a gas containing at least an oxide of nitrogen comprising the steps of contacting the gas together with a gaseous reducing fuel, at a temperature above the ignition temperature of the fuel, with a supported catalyst consisting essentially of an inert rigid porous refractory honeycomb structure coated with a mixture or alloy of platinum, rhodium and base metal in which the rhodium constitutes from 1 to 50 weight % and the base metal constitutes from 0.01 to 25 weight % of the total metal content.

According to a third aspect of the present invention, there is provided a process for the oxidation of an organic compound in a gas containing oxygen comprising passing the gas at an elevated temperature through a supported catalyst consisting essentially of an inert rigid porous refractory honeycomb structure coated with a mixture or alloy of platinum, rhodium and base metal in which the rhodium constitutes from 1 to 50 weight % and the base metal constitutes from 0.01 to 25 weight % of the total metal content.

In each of the above three aspects of the present invention, the catalyst preferably includes a first coating applied to the honeycomb structure, the first coating containing at least one oxide selected from the group constituted by the oxides of titanium, zirconium, hafnium and thorium.

More particularly, the catalyst used in the processes of the invention consists essentially of an inert rigid porous refractory ceramic honeycomb having applied thereto a first adherent catalytically active refractory metal oxide coating containing at least 50% by weight of alumina, in which one or more of the oxides titania, zirconia, hafnia and thoria constitute at least 5% by weight of the refractory metal oxide and having a second coating of an alloy containing 1 to 50 weight % rhodium, from 0.01 to 25 weight % base metal selected from the group consisting of aluminium, magnesium, chromium, molybdenum, tungsten, manganese, iron, cobalt, nickel, copper, titanium, vanadium, thorium, uranium, copper, silver, zinc, indium, cadmium, mercury, iridium, thallium, bismuth, tin, lead, antimony, the lanthanides and the antinides, and neodymium and balance platinum. Preferably, the final surface coating containing 0.01 to 10 weight % of the total metal content.

Catalysts according to the present invention may also be used for the production of methane by the steam reforming of naphtha. Significant quantities of methane are produced by the passage of naphtha feedstocks at high temperature (preferably 250° - 2,000° C) and pressure (preferably 300 to 1,000 psig) through the above described Pt-Rh-base metal catalyst. Good results are obtained with cobalt, iron and copper. This process has application where natural gas supplies are not readily available.

By "base metal" we mean one or more metal other than those of the platinum group metals and gold. Base metals which we prefer are aluminium, magnesium, chromium, molybdenum, tungsten, manganese, iron, cobalt, nickel, copper, titanium, vanadium, thorium, uranium, copper, silver, zinc, indium, cadmium, mercury, iridium, thallium, bismuth, tin, lead, antimony, the lanthanides and the actinides. Of these we particularly prefer nickel and copper. Other base metals which produce good results are iron, cobalt, silver and the lanthanide series, particularly neodymium. By "lanthanide series of metals" we mean those elements having atomic numbers from 57 – 71 inclusive and the term "organic compound" includes carbon monoxide. For the purpose of this specification we include silver as a base metal although it is of course often regarded as a noble metal.

By "elevated temperature" we mean a temperature sufficient for catalytic oxidation of a significant quantity of the organic compound or catalytic reduction of a significant quantity of the oxide of nitrogen etc., to occur as a result of contact with the catalysts of the invention. For example, in the case of producing methane by reforming naphtha, the "elevated temperature" is 300° C. In the oxidating of organic compounds, e.g. benzene, carbon monoxide and propylene, the elevated temperatures are 180° C, 150° C and 200° C respectively.

Preferably, the first coating contains at least 5% by weight of an oxide(s) selected from the group comprising the oxides of titanium, zirconium, hafnium and thorium. The first coating, which may be in the form of a layer or deposit is, thereafter, preferably coated or impregnated with the mixture or alloy of platinum, rhodium and optionally base metal as specified above. Alternatively, the material forming the first coating, layer or deposit may be pre-coated or pre-impregnated with the said mixture or alloy as specified, prior to application thereof to the inert material.

The inert material may have a first deposit of a refractory metal oxide which is itself then impregnated or coated with the mixture or alloy of platinum, rhodium and base metal component as specified above. Conveniently, the said mixture or alloy contains from 5 to 45 weight % and preferably 35 weight % rhodium considered relative to the total metal in the mixture or alloy. If a lanthanide metal component is present, it is preferably 5% of the total metal component present and at least 50% by weight of the total base metal component present. The base metal component may be 5 – 10 weight % of the total metal component present.

A further catalyst according to this invention comprises an inert rigid porous refractory honeycomb structure, a first or intermediate coating containing at least one oxide selected from the group constituted by the oxides of titanium, zirconium, hafnium and thorium and a final surface coating of a mixture or alloy of platinum, rhodium and optionally base metal, the mixture or alloy containing from 1 to 50 weight % rhodium and from 0.01 to 25 weight % base metal considered relative to the total metal content.

Preferably, the first coating of refractory metal oxide is mainly alumina, that is at least 50 weight %, but contains at least 5% by weight of $HfO_2$ and $ThO_2$ which is further impregnated or coated with the said mixture or alloy of platinum, rhodium and base metals.

Conveniently the gas to be processed is in the form of a stream.

The following characteristics have been found to be suitable in the working of the invention, but are not, of course, obligatory.

The inert structure used in the process of the present invention and on which the refractory metal oxide is deposited, is an inert unitary rigid honeycomb structure or block having a plurality of pores or channels therethrough extending in the direction of gas flow. The structure will usually occupy nearly all of the cross-sectional area of the reaction zone available with a packing between the structure and the reactor walls so as to prevent by-passing of the structure by any part of the gas stream. Alternatively, the inert structure may be of corrugated cellular form.

The inert material used in the present invention, on which the refractory metal oxide is coated, may be any refractory compound which is unreactive with the coating and which can be prepared in a form which has a high surface area. It is preferably also unreactive with any of the gaseous constituents present in the operation of the process. Oxides, or mixture of oxides, of one or more of the following elements may be used as the inert material ultimate support: magnesium, calcium, strontium, barium, aluminium, scandium, yttrium, the lanthanides, the actinides, gallium, indium, thallium, silicon, titanium, zirconium, hafnium, thorium, germanium, tin, lead, vanadium, niobium, tantalum, chromium, molybdenum, tungsten, and uranium. Compounds such as the carbides, borides and silicides of the transition metals may also be used. Other suitable ceramic materials which may be used are zircon-mullite, mullite, alpha alumina, sillimanite, magnesium silicates, zircon, petalite, spodumene, cordierite and alumino-silicates. Suitable proprietary products are "MATTECEL" (Trade Name) supplied by Matthey Bishop Inc., "TORVEX" (Registered Trade Mark) sold by E. I. du Pont de Nemours & Co., and "THERMACOMB" (Registered Trade Mark) sold by the American Lava Corporation. Another useful product is described in British Pat. No. 882,484.

For large cross-sectional areas, say six inches, or more, it is convenient to provide a regularly arranged array of closely fitting blocks of ceramic. Also it may be desirable for more complete purification to provide sequential or serial block positioning. In this latter case, and if desired, the low back pressure may be further reduced between layers of blocks by shallow parallel grooves at an end of a block to enlarge connections between channels. Advantageously, the unitary structure is shaped to fit and, preferably, closely fit, the reaction zone or reactor into which it is to be disposed. Blocks of appropriately shaped honeycomb materials to support the catalyst are placed in the reactor so that the general direction of the cellular gas flow channels is in line with the gas flow through the reactor, Alternatively, the blocks may be disposed so that gas flow through the reactor is radial or transverse to the general or overall gas flow.

The structure support is constructed of a substantially chemically inert, rigid, solid porous refractory material capable of maintaining its shape and strength at high temperatures, for instance up to 1100° C or more. The refractory material should preferably have a bulk density of from 0.45 to 1.05 grams per cubic centimeter, (from 0.5 to 0.9 grams per cubic centimeter is more suitable) and be unglazed. The accessible pore volume not including the volume of gas flow channels is preferably greater than 0.10 cubic centimeter per gram of structure, more preferably between 0.20 and 0.30 cc/g.

The walls of the channels of the unitary support structure of this invention contain macropores in communication with the channels to provide increased accessible catalyst surface, and an absence of large numbers of small pores for high temperature stability and strength. Whereas the superficial surface area of such structures may be from 0.001 to 0.01 m²/g including the channels, the total surface area is typically hundreds of times greater, so that much of the catalytic reaction will take place in the large pores. The structure preferably has a macropore distribution such that over 95% of the pore volume is in pores having a size, i.e. diameter, greater than 2000 Angstrom units, and over 5% of the pore volume preferably is in pores having a size of over 20,000 A. In a preferred embodiment over 50% of the pore volume is in pores of sizes of over 20,000 A.

The superficial surface area of the carrier including the walls of the gas flow channels should be as large as is consistent with an acceptable back pressure in the gas flow system. The superficial surface area will often be from 0.5 to 6, preferably from 1 to 2.5 square meters per liter of support. Thus, the channels through the unitary structure can be of any shape and size consistent with the desired superficial surface and should be large enough to permit free passage of the contaminant containing gas to be purified and to prevent plugging by any solid matter entrained by the gas. In one embodiment, the channels are generally parallel and extend through the support from one side to an opposite side, and preferably such openings are separated from one another by thin walls defining the openings. In another embodiment, a network of channels permeates the body. The channels are unobstructed or substantially unobstructed to the gas flow. For most efficient operation, the channel inlet openings are distributed across essentially the entire face or cross-section of the support subject to initial contact with the gas to be reacted. The preferred supports are of mullite or zircon-mullite having good thermal shock resistance owing to a low coefficient of thermal expansion, although other similar chemically inert refractory crystalline ceramic materials can also be employed. Examples of other refractory materials suitable as a support or carriage are, for instance, alpha alumina, sillimanite, magnesium silicates, zircon, petalite, spodumene, cordierite, alumino-silicates etc.

Unlike a pellet catalyst bed which must be vertical with downward gas flow, there is no restriction on either the position of a ceramic honeycomb catalyst or the direction of the gas flow through a reactor containing it. Ceramic honeycombs have a high surface-to-volume ratio and, therefore, when supporting catalytic metals produce catalysts which are more active than pelleted catalysts. Because of their open structure, the pressure drop across a ceramic honeycomb catalyst bed is only 1/20 of that across a pellet bed of similar dimensions. Honeycomb supports also have high thermal shock resistance and structural strength and have the great advantage of being attrition resistant.

The refractory metal oxide layer containing one or more oxides of titanium, zirconium, hafnium and thorium is deposited on the support (either continuously or discontinuously) and preferably the deposit is in the form of a film of from 0.0004 to 0.001 inches thick. This oxide layer is itself characterised by a porous structure and which possesses a large internal pore volume and total surface area and is therefore referred to as an "active" (i.e. catalytically active) refractory metal oxide. Upper operating conditions this layer shows remarkable stability at high temperature and inertness towards the platinum group and base metal with which they may be in contact. Previously catalysts of this type have been deactivated by reaction of the catalytically actie metal, such as the platinum group metal with the intermediate refractory metal oxide coating. We have found that this is not the case with the four named oxides and the particular ratios of platinum, rhodium and base metal referred to herein. Catalysts according to this invention, therefore, represent a considerable advance over prior art catalysts.

A preferred active refractory metal oxide layer also contains members of the gamma or activated alumina family which can be prepared, for instance, by precipitating a hydrous alumina gel and, thereafter, drying and calcining to expel hydrated water and provide the active gamma alumina. A particularly preferred active refractory metal oxide is obtained by drying and calcining at temperatures of 300° C to 800° C a precursor mixture of hydrous alumina phases predominating in crystalline trihydrate, that is, containing in excess of 50% by weight of the total alumina hydrate composition, preferably from 65% to 95% by weight of one or more of the trihydrate forms gibbsite, bayerite and nordstrandite by X-ray diffraction.

Various examples of catalyst preparations incorporating zirconia, titania and thoria will now be described. In particular, the examples show the effects of incorporating zirconia, titania and thoria in the first coating applied to the inert, rigid porous refractory ceramic honeycomb. In carrying out tests on which these examples are based, hafnia was not used but, since it is well reported in the literature that the chemical properties of hafnia closely resemble those of zirconia, we believe the results we obtained for zirconia can also be applied to hafnia.

EXAMPLE I

Thoria

The following samples were prepared:

a. A standard automobile exhaust catalyst washcoat was made up using FRF80 alumina (sold by British Aluminium (GB) — an aluminium trihydrate known as Gibsite) prefired at 600° C, and pieces (2"φ × 1") of Thermacomb (Registered Trade Mark, manufactured by the American Lava Corporation) were washcoated in the usual way, dried and calcined at 450° C for 2 hours. The calcined pieces were then immersed in a solution of thorium nitrate of concentration such that the volume initially absorbed (1 minutes immersion) resulted in a concentration of $Th^{4+}$ in the washcoat equivalent to 1% molar, based on the alumina.

b. A volume of thorium nitrate solution designed to give a final 1% molar concentration of $Th^{4+}$ was added to a standard washcoat mixture. The addition was made to a suspension of alumina sol gel (sometimes referred to as ASG — an aluminium monohydrate (Boehmite) manufactured by the Atomic Energy Research Establishment, Harwell, England) before the addition of FRF80 (fired at 800° C). The acidity of the resulting nitrate solution was found to make the addition of nitric acid (usually required to bring final pH to 2 – 3) unnecessary. One group of Thermacomb samples washcoated with this mixture was calcined at 450° C for 2 hours and another group at 800° C for 2 hours.

c. A quantity of colloidal thoria equal to 50 wt% of the ASG of a batch of standard washcoat, was dispersed in the minimum of water. The standard quantity of ASG was dispersed in water and 50% of the usual amount of FRF80 was added; the dispersion of thoria was then added with stirring, followed by the remaining FRF80 alumina. Washcoating of Thermacomb pieces was achieved satisfactorily but the mixture showed a tendency to separate out overnight although it could be redispersed easily.

EXAMPLE II

Titania

A sample of dispersible titania gel, supplied by the Atomic Energy Research Establishment, Harwell, England, was used in place of ASG in an otherwise standard washcoat. The resulting washcoat could be stirred satisfactorily but gelled rapidly on standing, making washcoating difficult.

EXAMPLE III

Zirconia

Four different preparations are indicated below:
a. Impregnation with Zirconium nitrate This was by a method analogous to that used under subparagraph (a) for Thoria. In this method the laboratory reagent did not completely dissolved but gave a suspension; this is thought to be due to the salt existing as the basic nitrate since pure $Zr(NO_3)_4$ is apparently extremely difficult to prepare. Samples of washcoated material were prepared as follows:

FRF80 (450°) + ZR (1%) metallised with 35% RH/Pt at 120 g/ft$^3$

FRF80 (600°) + Zr (1%) metallised with 7½% Rh/Pt at 40 g/ft$^3$.

b. Incorporation of Zirconia sol (ZS) — a zirconia hydrate

A sample of aggregated zirconia sol was obtained from Magnesium Elektron Ltd. When dispersed in water the sol gave an acidic solution (pH 2) which had a tendency to contain small particles of insoluble material. Washcoat systems in which a proportion of the alumina sol gel (ASG) of the standard specification was replaced by zirconia sol (ZS) were made as follows:
b1. ASG (0%) + ZS (100%)

i. FRF80 was added to the dispersion and after about ⅓ of the alumina had been added complete gelling occurred; addition of either $NH_4OH$ or $H_2O$ did not break down the gel.

ii. FRF80 was suspended in water, ZA in water was added with stirring; the resulting mixture was too viscous to stir efficiently and dilution with either $H_2O$ or $NH_4OH$ was again of no benefit.

b2. ASG (50%) + ZS (50%)

ASG was dispersed in water and FRF80 added during stirring. As the mixture became viscous, portions of ZS in water were added (the acidity of the ZS reducing the pH and aiding stirring) and with vigorous stirring all the FRF80 was assimilated. Finally 1.5 ml concentrated $HNO_3$ was added to bring the pH to 3. The resulting mixture could be pumped (using a Silverson emulsifier) only with difficulty and after one piece of Thermacomb had been coated further dipping attempts failed due to the inability of the washcoat to penetrate the monolith cells.

b3. ASG (90%) + ZS (10%)

FRF80 was added to the ASG dispersion with stirring and with additions of ZS and concentrated $HNO_3$. The mixture could be stirred easily but catalyst pieces would not submerge in the stationary mixture. Washcoating was achieved using the Silverson emulsifier and pumping.

c. Incorporation of Ammonium Zirconium Carbonate (AZC)

The AZC used was supplied by Magnesium Elektron Ltd. as a solution in water (pH 10) equivalent to 20% of zirconia, and is described as being stable in alkaline solution but gelling on addition of acid or heating above 40° C.

Attempts were made to add AZC to mixtures containing FRF80 added to ASG dispersions. However, in all ranges of proportions, immediate gelling or precipitation occurred indicating that the regions of pH in which the alumina and AZC are stable are incompatible.

d. Incorporation of Zirconium Acetate (ZA)

The ZA used was supplied by Magnesium Elektron Ltd. as a solution in water (pH3) equivalent to 22% zirconia, and is described as being stable in acid solution but concentrating on heating and gelling with MgO additions.

It was found that the addition of ZA to a standard automobile exhaust catalyst washcoat apparently decreased the viscosity of the stirred mixture but increased its surface tension when stationary since Thermacomb pieces would not submerge. Using the Silverson emulsifier, washcoating was achieved using mixtures containing two separate additions of ZA and one in which ZA was partially substituted for ASG.

After washcoating, the catalysts prepared as described above were calcined at between 450° C – 800° C to decompose the incorporated salt to the corresponding oxide, and were then metallised with 7½% Rh/Pt at a nominal loading of 40 g/ft$^3$ (In one case 35% Rh/Pt at 120 g/ft$^3$ was used). The catalysts were then evaluated for activity over 100 hours in the oxidation of methane.

FIG. 1 shows the performance of the thoria treated samples under durability tests. It can be seen that these catalysts do have a significantly greater resistance to loss of oxidising ability particularly when the thoria is incorporated into the washcoat mixture. The sample in which colloidal thoria was used has not yet been tested.

The durability tests of the thoria samples were carried out under oxidising conditions at S.V. = $10^5$ hr$^{-1}$ and under a pressure of 75 psig with the following gas mixture:

N$_2$ (100%);
O$_2$ (3%);
CH$_4$ (115% — stoichiometric);
NO$_X$ (0.2%), and
Steam (1%).

In FIG. 1 the graph shows percentage hydrocarbon conversion plotted against catalyst life (measured in hours) for the undermentioned four catalysts bearing the designations and compositions indicated:
- ● — FRF80 (800° C)/Thermacomb/7½% Rh/Pt at 40 g/ft$^3$.
- △ — FRF80 (800° C)/Thermacomb/Th nitrate impregnated/7½% Rh/Pt at 40 g/ft$^3$.
- ▫ — FRF80 (800° C) + Th (1% molar)/Thermacomb/calcined at 450° C/7½% Rh/Pt at 40 g/ft$^3$.
- ◇ — FRF80 (800° C) + Th (1% molar)/Thermacomb/calcined at 800° C/7½% Rh/Pt at 40 g/ft$^3$.

The performance during durability tests of the zirconia treated catalyst samples is shown in FIGS. 2 and 3. The graph of FIG. 2 was drawn as a result of durability tests for five catalysts carried out under oxidising conditions at S.V. = $10^{-5}$ hr$^{-1}$ and under a pressure of 75 psig.. The gas mixture used was the same as for the Thoria. The five catalysts tested had the compositions indicated below and shown alongside the designations used in the Figure.
- ● — FRF80 (800° C)/Thermacomb/7½% Rh/Pt at 40 g/ft$^3$.
- ▫ — FRF80 (600° C)/Zr nitrate impregnated/Thermacomb/7½% Rh/Pt at 40 g/ft$^3$.
- ⊗ — FRF80 (800° C) + 90% ASG/10% ZS/Thermacomb/7½% Rh/Pt at 40 g/ft$^3$.
- ◇ — FRF80 (800° C) + 50% ASG/50% ZS/Themacomb/7½% Rh/Pt at 40 g/ft$^3$.
- △ — FRF80 (800° C) + 50 ml ZA/Thermacomb/7½% Rh/Pt at 40 g/ft$^3$.

In the durability tests of zirconia treated catalysts as shown in FIG. 3, the conditions were the same as used to obtain the results of FIG. 2. The gas mixture was, however, changed and had the composition N$_2$(100%); O$_2$(3%); natural gas (50% stoichiometric); NO$_X$(0.2%) and Steam (1%). Two catalysts were tested, and the compositions thereof together with the designations used in FIG. 3 are shown below.
- ● — FRF80 (450° C)/Thermacomb/35% Rh/Pt at 120 g/ft$^3$.
- ▫ — FRF80 (450° C) + Zr$^{4+}$ (1% incorporated)/Thermacomb/35 Rh/Pt at 120 g/ft$^3$.

The tests of catalysts incorporating hafnia, titania, zirconia and thoria in washcoated systems given above indicate a significant improvement in catalyst durability under extremely severe test conditions, namely, methane oxidation.

Other suitable active refractory metal oxides which may be used in conjunction with the oxides of titanium, zirconium, hafnium and thorium include for example, active or calcined beryllia, magnesia or silica, and combination of metal oxides such as boria-alumina or silica-alumina. The active refractory metal oxide deposit may constitute from 1 to 50 weight percent of the unitary support, preferably from 5 to 30 weight percent.

The layer containing oxides of titanium, zirconium, hafnium and thorium may be deposited on the support in several ways. One method involves dipping the support into a solution of the salt of the refractory metal and calcining to decompose the salt to the oxide form. Another and preferred method comprises dipping the support into an aqueous suspension, dispersion or slurry of the refractory oxide itself, drying and calcining. In the latter method, suspensions or dispersions having a solids content of from 10% to 70% by weight can be used to deposit a suitable amount of a refractory metal oxide on the support in a single application. In order to prepare a catalyst having a 10% by weight of zirconia on a zircon-mullite structure, from 20 to 40% by weight of solids is used in the suspension. The percentage of the solids present is determined on an ignited weight basis (ignited at 1100° C). A particularly preferred method involves forming an aqueous dispersion or slurry as just described and subjecting the mixture to a wet grinding or milling operation whereby the oxide of titanium, zirconium, hafnium or thorium is reduced to a finely divided form and a thixotropic slip obtained, having the desired consistency, e.g. a solids content of 10% to 70% by weight. The support is then dipped into the slip, dried and calcined. In general, calcining temperatures of from 150° to 800° C are employed. The calcination is favourably conducted in air, for example flowing dried air, or may be carried out in contact with other gases such as oxygen, nitrogen, or flue gas or under vacuum conditions. The oxide of titanium, zirconium, hafnium or thorium is deposited on the surfaces of the structure including the channel surfaces and superficial macropores in communication with the channel surfaces as thin deposits in a weight ratio of from 1% to 50% and preferably from 5% to 30% relative to the weight of the block.

In an alternative embodiment of the present invention, a second intermediate support may also be used. For example, the oxide of titanium, zirconium, hafnium or thorium may be deposited upon particles of alumina, and the so-coated particles may then themselves be deposited upon the inert ultimate support material which may also, for example, be made of alumina. Alternatively, it could also be a honeycomb composed of any one of the ceramic materials detailed above. In this way, it is possible to produce a catalyst which presents a very much larger surface area of catalytically active metal to the reacting gases. It will be appreciated that more than one intermediate support may be utilised, depending upon the relative sizes of each of the particles involved. It is, however, not usually necessary to employ more than two intermediate coatings. For example, the structure of the catalyst could be as follows:
a. ultimate inert support material in ceramic honeycomb form;
b. particles of second inert material (which may be, but is not necessarily, the same as the first inert material) coated with
c. one or more oxides of titanium, zirconium, hafnium and thorium
d. catalytically active metal layer comprising a platinum-rhodium mixture or alloy, also containing up to 10% by weight of a base metal.

Known methods may be used for preparing structures of this type.

For example, to a colloidal dispersion of alumina in water i.e. hydrated alumium oxide sol there is added a soluble salt of titanium, zirconium, hafnium or thorium and an alkali such as ammonium hydroxide solution in sufficient quantity to precipitate the soluble metal salt as the oxide on to the colloidal aluminium particles. The precipitate may then be filtered and used to prepare a slip which can then itself be used for coating a ceramic honeycomb. The coated inert material particles are preferably between 0.01 and 25 microns in diameter. Further, the inert material may be completely coated with precipitated oxide of titanium, zirconium, hafnium or thorium.

An alternative method is co-precipitation. Solutions of soluble salts of the inert material oxide precursor (e.g. aluminium nitrate if the inert material is to be alumina) and titanium, zirconium, thorium or hafnium are treated wit sufficient alkali, preferably ammonium hydroxide solution, to precipitate both metal oxides together. However, this method is not so satisfactory, and it may be modified by using a slurry of the metal salt.

The structure support may be wetted prior to applying the refractory metal oxide. In one embodiment, a zircon-mullite structure is immersed in an aqueous suspension containing the desired weight concentration of hydrated refractory oxide. The structure, because of its porosity, has been found to absorb the suspension readily. The catalyst structure is then dried and calcined at a temperature of from 400° C to 800° C and preferably of from 450° C to 550° C. A ⅛ cubic foot zircon-mullite block absorbs roughly from 0.25 to 1 liter of the suspension.

The supported catalyst made in accordance with the method of this invention has a refractory oxide deposited on the inert ceramic structure and a catalytically active metal impregnated on the refractory oxide.

Impregnation with the mixture or alloy of platinum, rhodium and base metal may be accomplished by known methods of deposition of catalytically active metals on supports. For example, if a ceramic honeycomb structure is used with a high surface area deposit of titania, zirconia, hafnia or thoria deposited thereon, the support may be immersed in a solution of water soluble inorganic salt or salts of the platinum, rhodium and base metal such as (for example) chloro-platinic acid, rhodium trichloride and nickel-chloride, agitating the mixture to ensure uniform distribution, and precipitating the metals by chemical or thermal reduction or by precipitating them in a chemically combined state on the support structure. The metal is activated by conventional techniques. After impregnation with platinum, rhodium and base metal, the catalyst may be advantageously contacted with hydrogen sulphide to fix the platinum-rhodium-base metal alloy or mixture in the catalytically active film of oxide as a sulphide. This also gives a more active and suitable catalyst with good dispersion of the platinum-rhodium-base metal in a form preventing migration of the metal during drying and calcination. Alternatively, an aqueous solution of platinum, rhodium and base metal compounds may be reacted with hydrogen sulphide to form a sol, and this sol is applied to the film of intermediate refractory oxide. Following these treatments the completed catalyst can be calcined within the range of 150° C to 800° C and under conditions as previously disclosed.

It is desirable that the final catalyst has the intermediate support of titanium, zirconium, hafnium or thorium oxide in the activated or calcined state. It is also known that a ceramic catalyst carrier which has been stabilised by heating to at least 0.4 times its melting point in degrees Kelvin is very much more durable under operating conditions without any sacrifice in the activity of the catalyst. Activation of the intermediate metal oxide film may be carried out prior to depositing it upon the ultimate support or subsequent thereto and even after the platinum, rhodium and, if present, base metal impregnation step. Usually, such material is calcined or partially calcined before deposition on the ultimate support and also after such deposition, but before deposition of the catalytic metal component. The catalyst containing the platinum-rhorium-base metal mixture or alloy may be reduced by contact with molecular hydrogen at elevated temperatures before, during, or after calcination.

The amount of platinum, rhodium and, if present, base metal necessary will vary depending upon the particular ratio selected. In all instances, however, the amount of platinum, rhodium and base metal compounds added will be that sufficient to provide a small but catalytically effective amount of the metal in the final catalyst to catalyse the removal of organic contaminants from the gas. In general, the total amount of catalytically active metal component may be in the range of, by weight, from 0.05 to 10% preferably 0.5 to 2% (based on total supported catalyst structure).

Suitable concentrations which we have found to be satisfactory are 0.9% w/w and 1.8% w/w.

The catalysts according to the present invention when used for pollution control may be expected to have an active life of at least 2½ years. While palladium on ceramic honeycomb catalysts exhibit acceptable ignition temperatures, they have been found to be unstable at the temperatures of operation and have been known to fail in one month. This particularly so when the catalytically active refractory metal oxide intermediate support is alumina. Our results indicate that 5 – 40% rhodium, 95 – 60% (platinum plus base metal, if present) deposited upon an intermediate support of an oxide of aluminium plus titanium, zirconium, hafnium or thorium and an ultimate ceramic honeycomb support, produces a catalyst which combines a usefully low ignition temperature with exceptionally good stability under oxidising conditions at elevated temperatures.

In two preferred embodiments of catalysts, of the catalytically active metal components present (i.e. platinum, rhodium and base metal), rhodium constitutes 7.5% and 35% by weight of the total. It is also preferred that the combination of chemical and/or thermal methods of impregnation and reduction are such that an alloy of the metal components is formed on the surface of the support. However, not all base metal constituents will necessarily be reduced to metallic form. Compounds of chromium and tungsten, for example, are not likely to be fully reduced.

We have obtained good results in the oxidation of methane and for the production of methane by the catalytic reforming of naphtha with the following alloy compositions deposited upon intermediate layers of alumina containing 5% by weight hafnia or thoria and an ultimate ceramic honeycomb support:

| Weight Per Cent | | |
|---|---|---|
| Platinum | Rhodium | Base Metal |
| 90 | 6 | Nickel 4 |
| 87.5 | 7.5 | Nickel 5 |
| 91.5 – 89.5 | 7.5 | Nickel 1 – 3 |
| 64 – 62 | 35 | Nickel 1 – 3 |
| 91.5 – 90 | 7.5 | Cobalt 1 – 2.5 |
| 87.5 | 7.5 | Iron 5 |
| 91.5 – 89.5 | 7.5 | Copper 1 – 3 |
| 60 | 35 | Copper 5 |
| 64 – 62.5 | 35 | Co 1 – 2.5 |
| 64 | 35 | Cu 1 |
| 60 | 35 | Nd 5 |

-continued

| Platinum | Weight Per Cent | |  |
|---|---|---|---|
| | Rhodium | Base Metal | |
| 60 | 35 | Pb | 5 |
| 60 | 30 | Nd | 5 |
| | | Ni | 5 |
| 60 | 35 | Ni | 5 |

Satisfactory results are also obtained by using In, Sn, Zn, Ag or Cr as base metal.

The present invention also includes gases which have been processed by a method or catalyst according to the invention.

What is claimed is:

1. In a process for the reduction with a reducing fuel of an oxide of nitrogen which comprises passing the gas mixture at an elevated temperature through a supported catalyst, the improvement which comprises using as the supported catalyst, one consisting essentially of an inert rigid porous refractory honeycomb structure having a first coating thereon containing at least one oxide selected from the group constituted by the oxides of titanium, zirconium, hafnium and thorium and a second coating of a mixture or alloy of platinum, rhodium and base metal in which the rhodium constitutes from 1 to 50 weight % and the base metal constitutes from 0.01 to 25 weight % of the total metal content.

2. In a process for the reduction with a reducing fuel of an oxide of nitrogen which comprises passing the gas mixture at an elevated temperature through a supported catalyst, the improvement which comprises using as the supported catalyst, one consisting essentially of an inert rigid porous refractory ceramic honeycomb having applied thereto a first adherent catalytically active refractory metal oxide coating containing at least 50% by weight of alumina, in which one or more of the oxides titania, zirconia, hafnia and thoria constitute at least 5% by weight of the refractory metal oxide and having a second coating of an alloy containing 1 to 50 weight % rhodium, from 0.01 to 25 weight % base metal selected from the group consisting of aluminium, magnesium, chromium, molybdenum, tungsten, manganese, iron, cobalt, nickel, copper, titanium, vanadium, thorium, uranium, copper, silver, zinc, indium, cadmium, mercury, iridium, thallium, bismuth, tin, lead, antimony, the lanthanides and the actinides, and neodymium and balance platinum.

3. A process according to claim 1, wherein the base metal in the catalyst is selected from the group consisting of chromium, iron, cobalt, nickel, copper, silver, zinc, indium, tin, the lanthanides an neodymium.

4. A process according to claim 1, wherein the base metal in the catalyst is neodymium and constitutes at least 50% by weight of the total base metal component present in the said alloy.

5. A process according to claim 1, wherein the base metal in the catalyst is neodymium and constitutes at least 5% by weight of the total metal present in the said alloy.

6. In a process of catalytically reducing an oxide of nitrogen in a gas containing at least an oxide of nitrogen comprising the steps of contacting the gas together with a gaseous reducing fuel, at a temperature above the ignition temperature of the fuel, with a supported catalyst, the improvement which comprises using, as the catalyst, one consisting essentially of an inert rigid porous refractory honeycomb structure having applied thereto a first adherent catalytically active refractory metal oxide coating containing at least 50% by weight of alumina, in which one or more of the oxides titania, zirconia, hafnia, and thoria constitute at least 5% by weight of the refractory metal oxide and having a second coating of an alloy containing 1 to 50% weight % rhodium, from 0.01 to 25 weight % base metal selected from the group consisting of aluminum, magnesium, chromium, molybdenum, tungsten, manganese, iron, cobalt, nickel, copper, titanium, vanadium, thorium, uranium, copper, silver, zinc, indium, cadmium, mercury, iridium, thallium, bismuth, tin, lead, antimony, the lanthanides and the actinides, and neodymium and balance platinum.

7. A process according to claim 6, wherein the base metal in the catalyst is selected from the group consisting of chromium, iron, cobalt, nickel, copper, silver, zinc, indium, tin, the lanthanides and neodymium.

8. A process according to claim 6, wherein the base metal in the catalyst is neodymium and constitutes at least 50% by weight of the total base metal component present in the said alloy.

9. A process according to claim 6, wherein the base metal in the catalyst is neodymium and comprises at least 5% by weight of the total metal present in the said alloy.

10. In a process for the oxidation of an organic compound in a gas containing oxygen comprising passing the gas at an elevated temperature through a supported catalyst, the improvement which comprises using, as the catalyst, one consisting essentially of an inert rigid porous refractory honeycomb structure having applied thereto a first adherent catalytically active refractory metal oxide coating containing at least 50% by weight of alumina, in which one or more of the oxides titania, zirconia, hafnia, and thoria constitute at least 5% by weight of the refractory metal oxide and having a second coating of an alloy containing 1 to 50 weight % rhodium, from 0.01 to 25 weight % base metal selected from the group consisting of aluminum, magnesium, chromium, molybdenum, tungsten, manganese, iron, cobalt, nickel, copper, titanium, vandaium, thorium, uranium, copper, silver, zinc, indium, cadmium, mercury, iridium, thallium, bismuth, tin, lead, antimony, the lanthanides and the actinides, and neodymium and balance platinum.

11. A process according to claim 10, wherein the base metal in the catalyst is selected from the group consisting of chromium, iron, cobalt, nickel, copper, silver, zinc, indium, tin, the lanthanides and neodymium.

12. A process according to claim 10, wherein the base metal in the catalyst is neodymium and constitutes at least 50% by weight of the total base metal component present in the said alloy.

13. A process according to claim 10, wherein the base metal in the catalyst is neodymium and constitutes at least 5% by weight of the total metal present in the said alloy.

* * * * *